(12) United States Patent
Chen (10) Patent No.: US 9,712,315 B1
(45) Date of Patent: Jul. 18, 2017

(54) REFERENCE CLOCKED RETIMER MODEL

(71) Applicant: International Business Machines Corporation, Armonk, NY (US)

(72) Inventor: Zhaoqing Chen, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/047,143

(22) Filed: Feb. 18, 2016

(51) Int. Cl.
  H04L 7/00 (2006.01)
  H04L 25/00 (2006.01)
  H04L 25/40 (2006.01)
  H04B 1/04 (2006.01)

(52) U.S. Cl.
  CPC ......... *H04L 7/0037* (2013.01); *H04B 1/0475* (2013.01)

(58) Field of Classification Search
  CPC combination set(s) only.
  See application file for complete search history.

(56) References Cited

U.S. PATENT DOCUMENTS

| 4,805,198 A | * | 2/1989 | Stern | ........................ | G06F 5/10 331/1 A |
|---|---|---|---|---|---|
| 2008/0068236 A1 | | 3/2008 | Sheba et al. | | |
| 2013/0301691 A1 | * | 11/2013 | Wang | ..................... | H04B 17/14 375/221 |
| 2014/0107997 A1 | | 4/2014 | Li et al. | | |

FOREIGN PATENT DOCUMENTS

CN   103425810 A   12/2013

OTHER PUBLICATIONS

Chong et al., IBIS AMI Modeling of Retimer and Performance Analysis of Retimer based Active Serial Links, Jan. 2014, DesignCon.*
Chen, Decision Feedback Equalizer (DFE) Behavioral Macro Model for Packaging System Eye Diagram Transient Simulation, 2011, IEEE, p. 209-216.*
Shou et al., Design of CMOS Ternary Latches, Dec. 2006, IEEE, p. 2558-2594.*
Agilent Technologies, "Characterizing Your PLL-based Designs to Manage System Jitter", Agilent Technologies, Mar. 2008, 18 pages.
Chen, Zhaoqing, "Decision Feedback Equalizer (DFE) Behavioral Macro Model for Packaging System Eye Diagram Transient Simulations", IBM, IEEE, 2011, 8 pages.

(Continued)

*Primary Examiner* — Wednel Cadeau
(74) *Attorney, Agent, or Firm* — Cantor Colburn LLP (57) ABSTRACT

A method of analyzing a transient response of an electronic circuit includes forming a model of a retimer and receiving an analyzing the output signal of the retimer. The model includes: a signal input circuit that receives an input signal; a clock input circuit that receives a reference clock signal; a slicer that samples a signal produced by the signal input circuit based on the reference clock signal; and an output signal circuit that forms an output signal from a sample taken by the slicer and that is based on the reference clock signal.

16 Claims, 10 Drawing Sheets

(56) References Cited

OTHER PUBLICATIONS

Chen, Zhaoqing, "Receiver Macro Modeling Including DC, Filter, and Preamplifier Nonlinear Properties for Packaging System Transient Simulations", IBM, IEEE, Electronic Components and Technology Confernce, 2010, 8 pages.
Haur et al.,"IBIS AMI Modeling of Retimer and Performance Analysis of Retimer based Active Serial Links" DesignCon, 2014, 22 pages.
Honeywell, "HXSDO2 Slider: 1x/4x sRIO PHY and SERDES Quad Transceiver Radiation Hardened", www.honeywellmicroelectronics.com, 11 pages.
IDT,"PCI Express Reference Clock Requirements" Integrated Device Technology, An-843, Revision A May 12, 2014, 25 pages.
Li, et al.,"Transfer Functions for the Refence Clock Jitter in a Serial Link: Theory and Applications", ITC International Test Conference, IEEE, 2004, 10 pages.
List of IBM Patents or Patent Applications Treated as Related; Date File: Feb. 18, 2016, pp. 1-2.
Rao et al., "Analysis of Jitter-Induced Voltage Noise in Clock Channels", IEEE Transactions on Electromagnetic Compatibility, vol. 57, No. 4, Aug. 2015 pp. 788-795, 8 pages.
Rao et al., "Frequency Domain Analysis of Jitter Amplification in Clock Channels", in Proc.,2012, EPEPS, pp. 51-54, 4 pages.
Silicon Labs,"PCI Express 3.0 Jitter Requirements", AN562, rev. 1, Dec. 2010, 24 pages.
Zhaoqing Chen, "A Single-Ended-Mode to Mixed-Mode Transformer Spice Circuit Model for High-Speed System Signal Integrity Simulations", U.S. Appl. No. 15/047,002, filed Feb. 18, 2016.
Zhaoqing Chen, "Behavioural Circuit Jitter Model", U.S. Appl. No. 15/047,011, filed Feb. 18, 2016.
Zhaoqing Chen, "Data Clocked Retimer Model", U.S. Appl. No. 15/047,152, filed Feb. 18, 2016.

\* cited by examiner

REFERENCE CLOCKED RETIMER MODEL

BACKGROUND

The present invention relates to electronic circuits, and more specifically, to systems and methods for designing and analyzing the transient response of an electronic circuit.

Advances in the field of computer and electronic system design continue to drive and facilitate greater processing efficiencies. Through modeling and other analysis, electronic files containing designs for electronic circuits and computer systems are optimized for use as templates for hardware manufacturing and networking.

A typical computer/circuit design file includes text that accounts for numerous electronic hardware components. For example, a file containing a design commonly includes programmatic objects and identifiers descriptive of busses, microchips, expansion cards and other system hardware. A bus generally enables selective communication between a computer processor unit (CPU) and one or more components, such as those mounted on an expansion card. A typical bus, such as a Peripheral Component Interconnect or Industry Standard Architecture bus, may additionally couple to a main system circuit board. Expansion cards are typically thin, rectangular printed circuit boards that have connector pins along one edge that couple to corresponding sockets of the bus. Programmatic objects describing such components within the design file may include delay, routing, voltage, resistance, symbol and/or other parameter data.

In operation, actual components of a circuit cooperate to process electronic signals according to system requirements. More particularly, the components interconnect to generate and communicate electronic signals. Different combinations and configurations of components affect system performance. For example, component layout can impact system timing. System timing regards the arrival of a signal at a given component within a predetermined window of time. Each component visited along the path of a signal introduces varying delay that affects the time required for the signal to reach a destination component. Thus, successful timing requires coordination with other signals and signal paths to ensure coordinated system processing. Failure to achieve desired timing can result in processing delays, error and failure. For instance, a system function that conjunctively processes multiple signals cannot complete its processing until the last of the signals arrives. Thus, the function can be unduly delayed or altogether frustrated should an unacceptable amount of time lapse while waiting for the last of the signals to arrive. For example, delays may cause race conditions, where a process may shutdown altogether in response to a late signal.

Another performance factor affected by system design is noise. Noise is characterized as static or interference introduced as the signal travels through system components and connections. As such, the electrical characteristics of the signal change as it propagates through a system. For instance, square wave characteristics of an input signal may become less distinct due to loss dispersion encountered in a system. While some tolerance of noise is typically built into a system design specification, unacceptable noise levels can severely impact signal clarity and system performance. For example, data may become corrupted, e.g., a binary "1" may register as a "0."

Production of a hardware system represents a substantial investment of material, manpower and other economic resources. Consequently, it is advantageous to verify design integrity prior to committing it to hardware. More particularly, it is desirable to predict or otherwise analyze performance characteristics of a design prior to implementation. To this end, simulation programs, or engines, have been developed to model performance of the programmatic objects of a design. Such modeling practices help to assure conformity with system needs.

SUMMARY

According to an embodiment of the present invention, a method of analyzing a transient response of an electronic circuit is disclosed. The method includes forming a model of a retimer where the model includes: a signal input circuit that receives an input signal; a clock input circuit that receives a reference clock signal; a slicer that samples a signal produced by the signal input circuit based on the reference clock signal; and an output signal circuit that forms an output signal from a sample taken by the slicer and that is based on the reference clock signal. The method also includes receiving and analyzing the output signal.

According to another embodiment a computer program product comprising a computer readable storage medium having program instructions embodied therewith, the program instructions executable by a processor chip to cause the processor chip to analyze a transient response of an electronic circuit is disclosed. The processor chip to analyzes the transient response by: forming a model of a retimer, the model including: a signal input circuit that receives an input signal; a clock input circuit that receives a reference clock signal; a slicer that samples a signal produced by the signal input circuit based on the reference clock signal; and an output signal circuit that forms an output signal from a sample taken by the slicer and that is based on the reference clock signal. The processor also receives and analyzes the output signal.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As mentioned above, ensuring correct timing in circuits is important. Retimers are more and more widely used in high speed server systems including on-board and embedded-incable-connector applications to help ensure timing. A retimer consists of a complete receiver and a driver which are synchronized by clocks from either recovered from a data stream by a CDR (clock and data recovery) unit or a reference clock net. For example, a retimer may be present on both ends of a transmission line that forms part of a SerDes (Serializer/Deserializer).

Retimers are non-linear and time-variable active devices. At present, modeling of such retimers has proven difficult. For example, as retimers are non-linear, modeling based on S-parameter models is not effective. Further, transistor level model of retimers are too complex for regular signal integrity simulations.

Currently, the input/output buffer information specification-algorithmic modeling interface (IBIS-AMI) retimer model has been applied in industry for signal integrity simulations. However, the current modeling and signal integrity simulation method for including retimers are not straight-forward are require a piping simulation method only supported by some specific simulation tools. Thus, they are not general-purpose transient simulation tools which can deal with most nonlinear device models.

Herein disclosed is a model that can be used in model a reference clocked retimer. In particular, the model determines a from a reference clock for setting an output signal. This model includes a building block latch that changes states based on one or both the rising and falling edges of a received signal. The model may be implemented in a behavioral circuit modeling program. SPICE (Simulation Program with Integrated Circuit Emphasis), HSPICE, and POWER-SPICE are examples of such programs.

Figure 1:
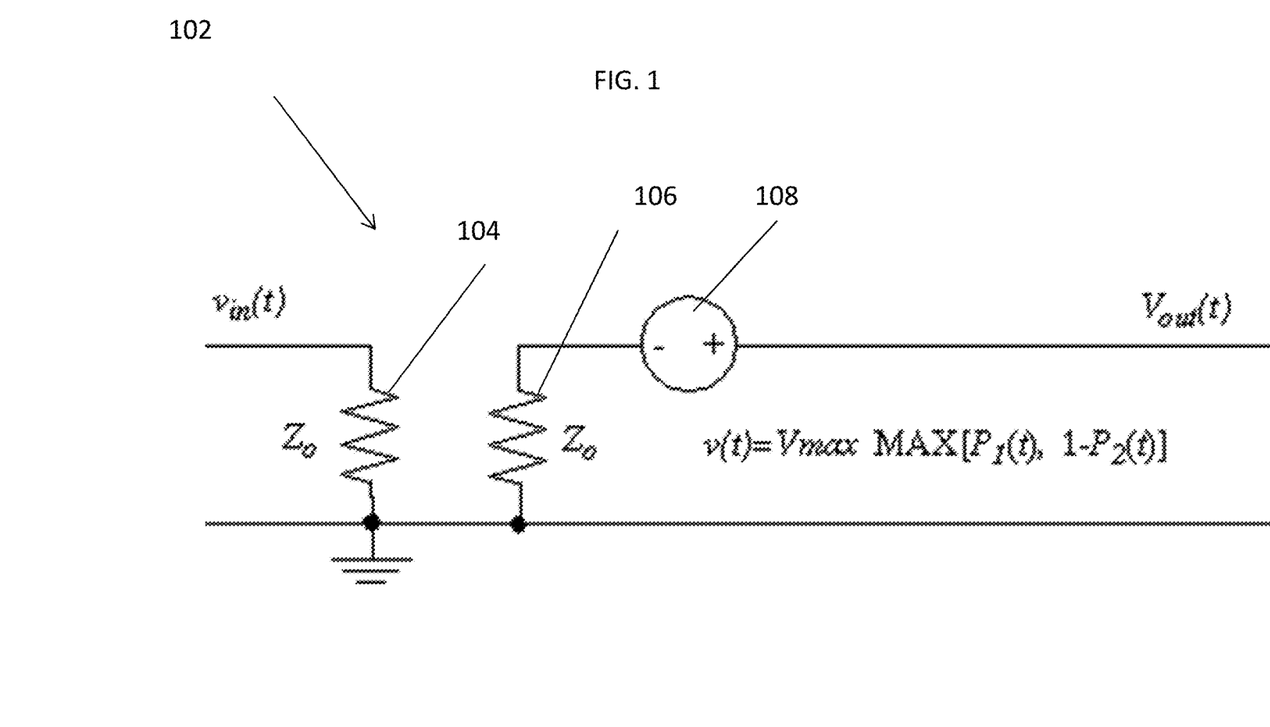
FIG. 1 is a simplified of a data triggered latch model according to one embodiment.
Figure 2:
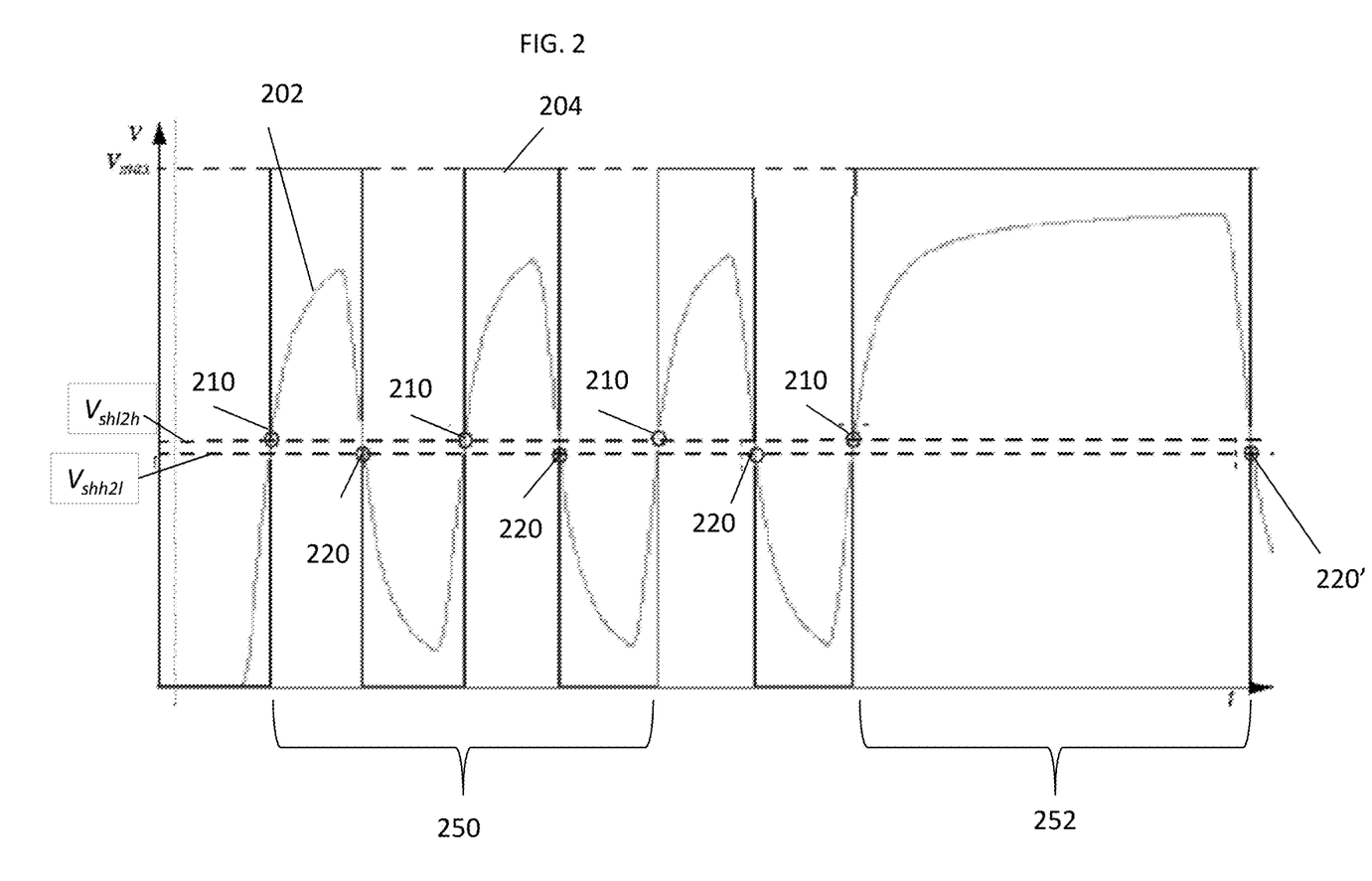
FIG. 2 is a graph showing the input and output of the data triggered latch of FIG. 1 according to one embodiment.

As illustrated, the data triggered latch 102 of FIG. 1, receives an input signal $v_{in}(t)$ and outputs $v_{out}(t)$. With reference now to FIG. 2, trace 202 represents an example of signal $v_{in}(t)$. The model shown in FIG. 1 may include two different threshold values that cause the latch to "switch" states. The threshold values are shown in FIG. 2 as switching voltages $V_{shl2h}$ (low-to-high) and $V_{shh2l}$ (high-to-low). As shown, $V_{shl2h}$ a little higher than $V_{shh2l}$. This is not required but may help ensure stability of the model output waveform by avoiding possible unexpected short impulse during the voltage level transition in practical application. In FIG. 2, each time $v_{in}(t)$ passes through $V_{shl2h}$ (from below; shown by circled events 210), $v_{out}(t)$ (trace 204) transfers from a low state to a high state. Similarly, each time $v_{in}(t)$ passes through $V_{shh2l}$ (from above; shown by circled events 220), $v_{out}(t)$ (trace 204) transfers from a high state to a low state.

In this case, the high state is generally shown as $V_{max}$ and the low state is shown as 0. Of course, in the case of differential input signal, the low state could be the opposite Vmax. As will be understood, the output of the latch 102 may be a variable duty square wave that follows the values of input signal. For example, for periodic changes of $v_{in}(t)$ the output $v_{out}(t)$ is simply a well-defined forced amplitude square wave as shown in region 250. In region 252, the input signal remains high to a longer time period so $v_{out}(t)$ remains high until the inputs signal falls (e.g., at crossing 220'). In this manner, the average rising or falling (or both) edges of input signal will determine the "clock output" of the retimer.

With reference again to FIG. 1, the model includes an input impedance 104 and an output impedance 106 both connected to ground. These impedances are shown as having value $Z_0$ which may be selected based on the particular context and is 100 ohms in one embodiment. The output impedance 106 is connected to a voltage controlled voltage source 108. That source, in combination with output impedance 106 defines $v_{out}(t)$.

In the above, 4 input parameters have been defined, $V_{shl2h}$, $V_{shh2l}$, $V_{max}$, and $Z_0$. The model accepts these as inputs and generates the voltage signal based of the source 108 based on the following equations:

$$v_{out}(t)=V_{max}*MAX[P_1(t),1-P_2(t)] \quad (1).$$

As can be seen, $v_{out}(t)$ will vary between to values, $V_{max}$ times either $P_1(t)$ or $1-P_2(t)$. As shown below, $P_1(t)$ or $1-P_2(t)$ vary between two and only two values based on comparisons of the input signal to the switching voltages $V_{shl2h}$ and $V_{shh2l}$. In particular:

$$P_1(t)=(0.5+0.5*SGN(v_{in}(t)-V_{shh2l}))*(1-P_2(t)); \text{ and} \quad (2)$$

$$P_2(t)=0.5+0.5*SGN(V_{shl2h}-v_{in}(t)) \quad (3)$$

where SGN (X) is 1 for x>0, −1 for x, 0 and 0 for x=0. The 0.5 factors for used in the above equations ensure that cases where negative input values may be accounted for while still also allowing for input values to vary from 0 to 1. Of course, such values may be replaced by other constants such as k1 and k2.

Figure 3:
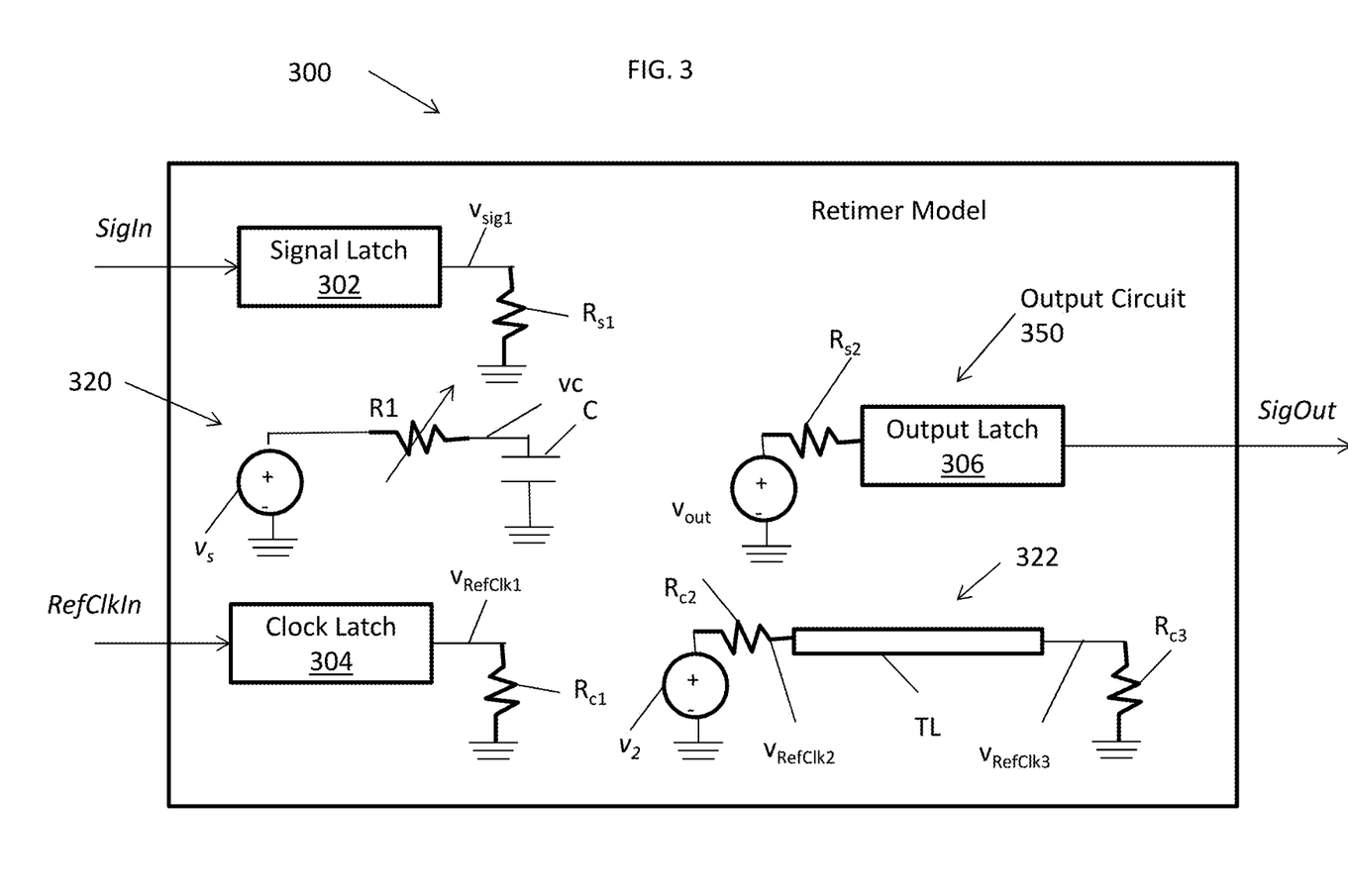
FIG. 3 is a simplified block diagram of reference clock driven retimer model according to one embodiment.

The above described latch 102 may serve as a portion of reference clock driven retimer model 300 as shown in FIG. 3. The reference clock driver retimer model 300 receives an input signal (SigIn) and outputs a signal referred to as SigOut. The retimer model 300 also receives a reference clock input RefClkIn. This clock is the clock that drives the retimer.

In general, in retimer model 300, the timing of output signal SigOut is controlled by the input reference clock (RefClkIn) while the level, either high or low, of the output signal SigOut is controlled by the input signal (SigIn) at a certain timing point.

In more detail, SigIn is provided to a signal latch 302. The signal latch (and all other latches described below) may be the same or similar to latch 102 described above. The values of the parameters for the signal latch 302 (as well as the others below) may be as follows: $Z_0$=1000, Vshl2h=2 mV, Vshh2l=−2 mV and $V_{max}$=2$V_{io}$. $V_{io}$ is the expected magnitude of the input voltage and may be, for example, in the range of 1.1V.

The signal latch 302 is connected to ground through a signal resistor $R_{s1}$ that is, in one embodiment, equal to $Z_0$. The output of the signal latch 302 is referred to as $v_{Sig1}$. As will be understood, the signal latch may help make the input signal more rectangular and sets it to specific levels (e.g, 2$V_{io}$).

The model 300 also includes a clock latch 304. The clock latch 304 is connected to ground through a clock resistor $R_{c1}$ that is, in one embodiment, is equal to $Z_0$. The output of the clock latch 304 is referred to as $v_{RefClk1}$. As will be understood, the signal latch 304 may help make the clock signal more rectangular and sets it to specific levels (e.g, 2$V_{io}$). Further, $v_{RefClk1}$ will set the beginning and ending time of a slice window that is used to "sample" $v_{sig1}$. The value of SigOut will stay at the value of $v_{sig1}$ until the next slice window occurs. Then, the value will either change or stay the same based again on the value of $v_{sig1}$ at the next slice window.

The length of time the slice window stays open may be set by transmitting a voltage (created by voltage controlled voltage source $v_2$) through a transmission line model TL. In particular, $v_2$ may be defined such that is forms a voltage equal to $2(v_{RefClk1}+V_{io}/2)$. Of course, the constants could be changed depending on the context. Voltage source $v_2$ is connected, to ground through the series connection of second clock impedance $R_{c2}$, transmission line TL and third clock impedance $R_{c3}$. Voltages at nodes immediately before and after the transmission line TL are referred to as $v_{RefClk2}$ and $v_{RefClk3}$. The skilled artisan will realize that these signals are substantial copies of one another, just time delayed by a delay constant τ of the transmission line TL. In one embodiment, τ is less that a bit period of an expected input signal. In another embodiment, τ is less that ⅕$^{th}$ of a bit period of an expected input signal. The values of $R_{c2}$ and $R_{c3}$ may be equal to $Z_0$ in one embodiment and TL may also have an impedance of $Z_0$.

As discussed above, the time shifted versions ($v_{RefClk2}$ and $v_{RefClk3}$) of the input clock $v_{RefClk1}$ can be used to set a time slice window. The time slice window can be applied to input signal $v_{sig1}$ by an RC circuit such that the circuit, during the time slice, matches $v_{sig1}$ and then holds that value until the next time slice.

To that end, the model 300 includes an input slicer circuit model 320. The model 320 includes a voltage source $v_s$ that is coupled to ground through a variable resistor R1 and a capacitor C. When R1 is a low value (as compared to a high value as will be shown below), the voltage at node vc (e.g., across capacitor C) follows vs. When the R1 is high, the time constant of the RC circuit comprised of R1 and C may be such that vc does not substantially decay on the time scale of the reference clock. That is, for the period of one reference clock cycle, vc substantially remains at the level of vs that occurred during the time slice window.

For example, C may be selected to be equal to 1 µF. Having different values of R1 that vary by 2-3 orders of magnitude will, thus, change the time constant appreciably. In one embodiment, high and low scaling values ($R_H$ and $R_L$) may be selected such that the value of R1 changes from a very small value to a very large value. For example, R1 may be defined in the model such that it equals:

$$R1 = ABS((R_L + R_H - INT(ABS(MAX(0.01 + v_{RefClk2} - v_{RefClk3}, 0.0)))R_H).$$

As will be appreciated from the above, at most times R1 equals at least $R_L + R_H$. During this time period, the value vc is held constant and the prior sample of vs is held. During the other time period, R1 is substantially close to zero (e.g., $R_L$). In particular, the MAX function will produce a number that is zero except for the times when $v_{RefClk2} - v_{RefClk3}$ is less than 0.01 (e.g, a time equal to τ). During that time, the INT/ABS/MAX functions result in a value of 1 and R1 is equal to $R_L$. During all other times, R1 is equal $R_L + R_H$.

Figure 4:
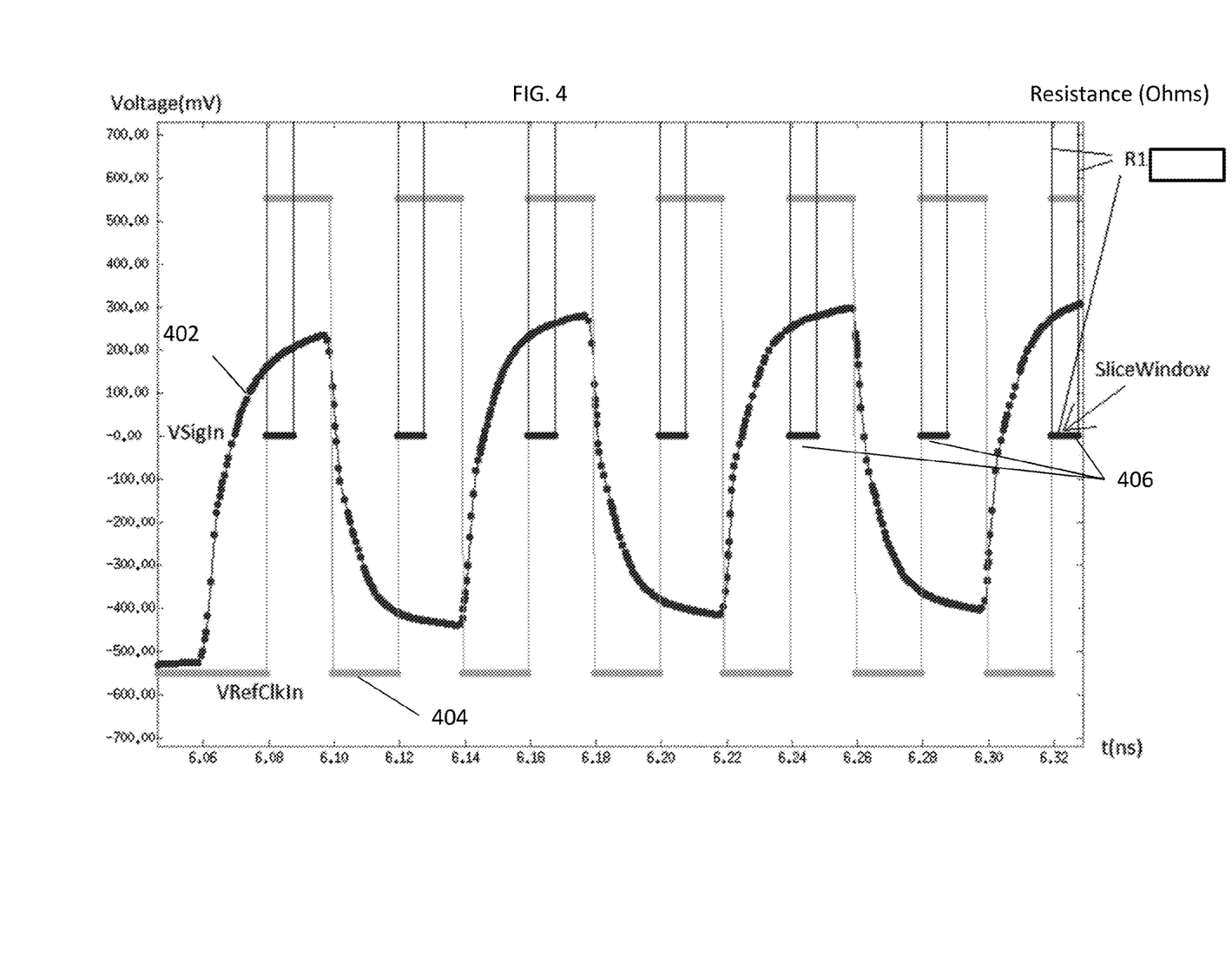
FIG. 4 is graph showing input an input signal, a clock signal and values of a slicer resistor.

FIG. 4 shows an example of the input signal SigIn and input clock signal as traces 402 and 404 respectively. Also shown by trace 405 is the value of R1. It varies from a high value to a low value. The low value is shown by lines 406 (in this case, about 0). Lines 406 define the slice window. From the above, the width of the slice window 406 is determined by the time constant of the transmission line TL.

Referring back to FIG. 3, the output voltage SigOut may then be formed by an output circuit 350. Output circuit 350 includes an output voltage controlled voltage source $v_{out}$ connected to an output latch 306 through output impedance $R_{s2}$ that may be equal to $Z_0$. In one embodiment, $v_{out}$ equals $2(vc - V_{io}/2)$. Of course, depending on the values of connections and termination in the models, the constants could change.

In summary, the model 300 receives both a signal and clock inputs. The clock input is used to form a delayed version of itself that sets a slice window that "latches" in a signal value for a time period set by the clock. This may be accomplished by an input slicer model 320 that includes a serial RC circuit whose time constant is varied based on a delay of a transmission line TL in a delay circuit 322. The latched signal values are then shaped and output by an output circuit 350.

Figure 5:
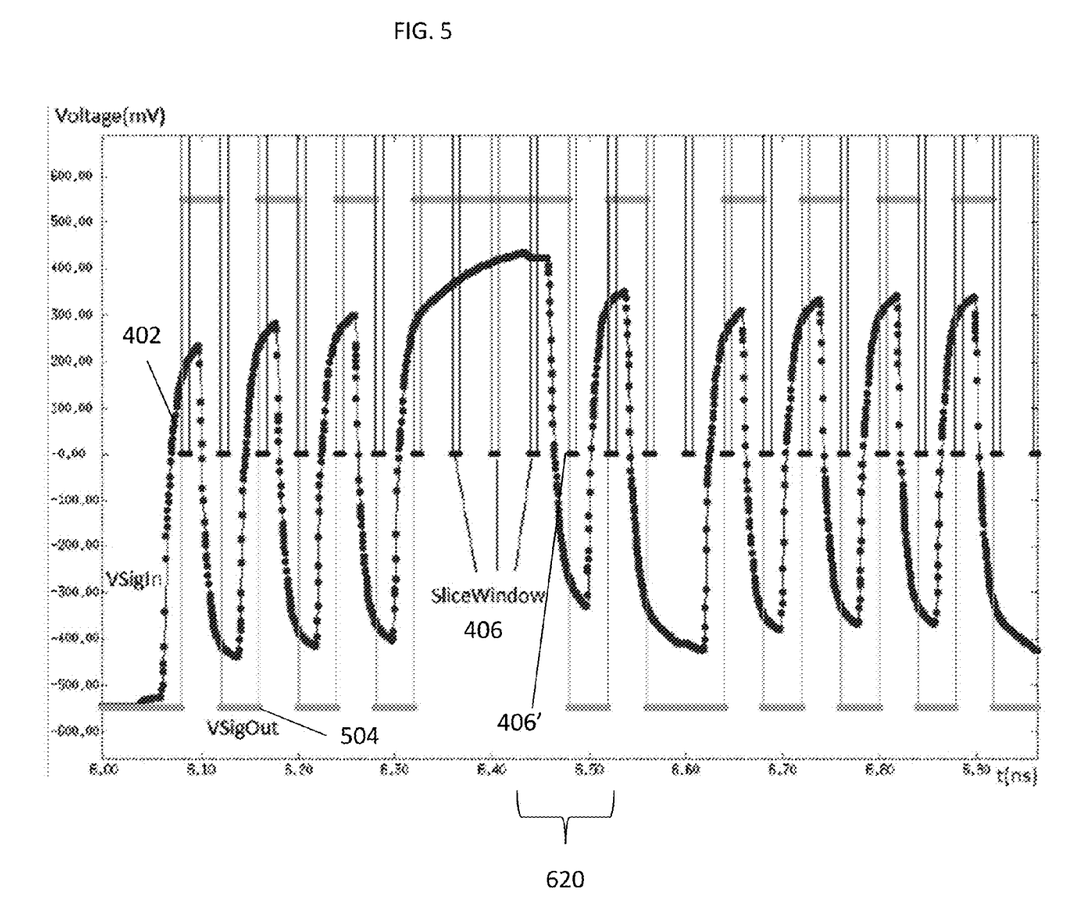
FIG. 5 is graph showing a comparison of input and output signals of the retimer of FIG. 3.

Referring now to FIG. 5, the input signal SigIn (before entering latch 302) is shown by trace 402 and the output signal SigOut is shown by trace 504. During time slice windows 406, the value of input signal is determined and the held until the next time slice window. As discussed above, the timing of the slice windows 406 is determined based on the input reference clock. In region 620 the fact that the clock sets the output timing is more fully shown. In particular, the output signal 504 does not go from a positive value to a negative value until slice window 406 even though the input signal (trace 402) crossed into a negative value before the time slice occurred.

Figure 6:
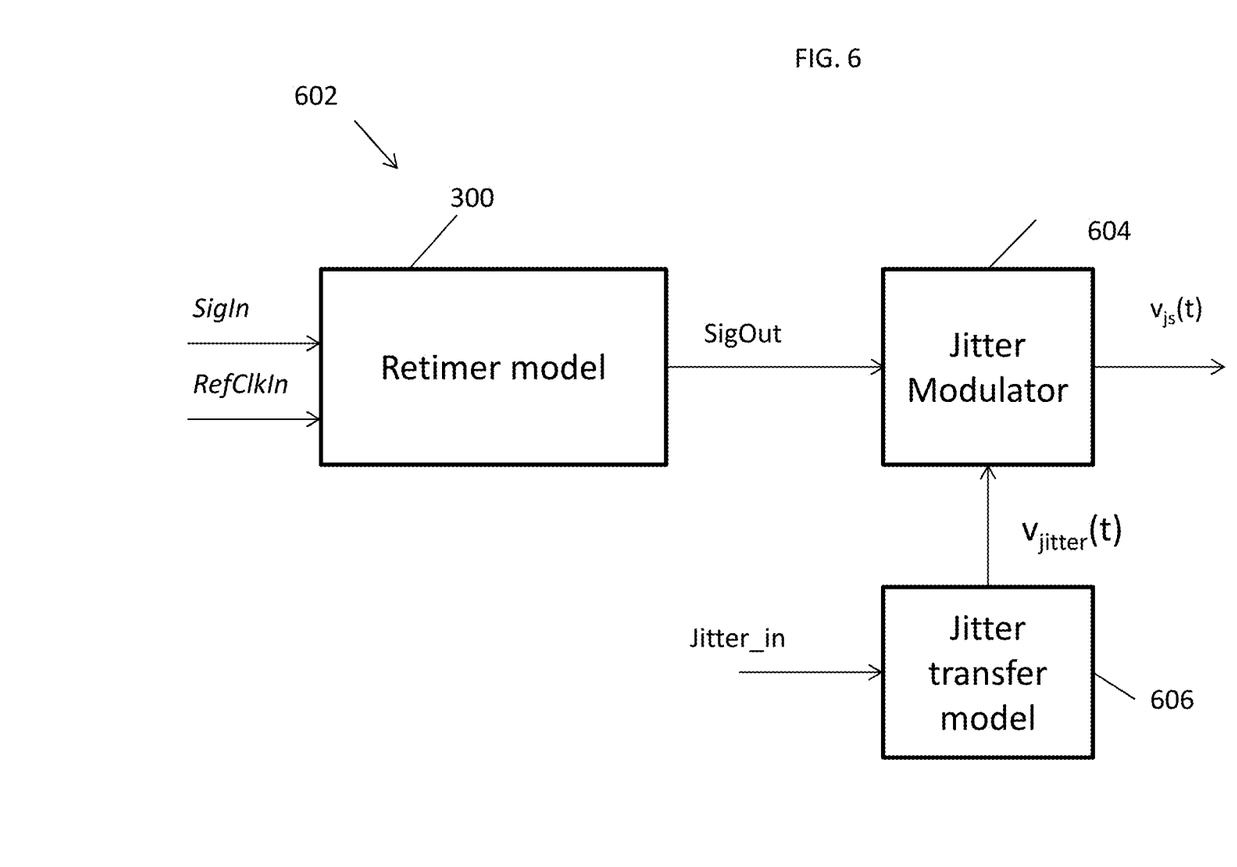
FIG. 6 is another embodiment of a reference clock driven retimer model.

In one embodiment, the reference clock driven retimer model 300 may be implemented as a standalone retimer model. In another embodiment, jitter may be implemented into the model to produce a more expansive model 602 as shown in FIG. 6. In this model, SigOut is provided from the reference clock driven retimer model 300 to a jitter modulator 604 that may allow for jitter in the clock signal to be accounted for. The jitter modulator 604, in short, modulates a jitter effect on a clock onto SigOut to produce a jittered modulator signal. The signal to be modulated onto that signal is called $v_{jitter}(t)$ and may be generated by jitter transfer model 606.

The jitter may come from, for example, intersymbol interference, cross talk, and the like. Other jitter sources such as low frequency periodic jitter which may be caused by EMI should be generally included in a jitter source that generates produces a jitter signal Jitter_in.

In more detail, the effects of a lossy reference clock channel may be derived from an $S_{21}$ parameter of a clock channel. In particular, the channel may be modelled by a simple transfer function governed by the below:

$$H(s) = 1 - H_2(s); \quad (4)$$

$$H_2(s) = \frac{2\zeta\omega_n s + \omega_n^2}{s^2 + 2\zeta\omega_n s + \omega_n^2}; \text{ and} \quad (5)$$

$$\omega_n = \omega_{3dB} \Big/ \sqrt{1 + 2\zeta^2 + \sqrt{(1 + 2\zeta^2)^2 + 1}} \, . \quad (6)$$

In the above, ζ is the dumping factor, $\omega_n$ is the natural frequency and $\omega_{3\,dB}$ is the 3 dB frequency (e.g., 15 MHz).

Replacing s with jω in equations 4 and 5 will result in a real frequency H(jω) table (see table 1 below) which represents $S_{21}(\omega)$ for single-ended and net and $S_{dd21}(\omega)$ for a differential net. Further, assuming a perfect terminal match condition and uni-directional transmission $S_{11}(\omega) = S_{12}(\omega) = S_{22}(\omega) = 0$.

TABLE 1

| |
|---|
| $S_{11}(\omega) = 0$ |
| $S_{12}(\omega) = 0$ |
| $S_{21}(\omega) = H(j\omega)$ |
| $S_{22}(\omega) = 0$ |

For simplicity, only single-ended net is shown above. Of course, if a mixed mode signal is being considered, a single-ended-mode to mixed-mode transformer can be used to transform the mixed-mode with differential-mode and zero common-mode to single-ended-mode. Such a transformer is disclosed in U.S. patent application Ser. No. 15/047,002, entitled A SINGLE-ENDED-MODE TO MIXED-MODE TRANSFORMER SPICE CIRCUIT MODEL FOR HIGH-SPEED SYSTEM SIGNAL INTEGRITY SIMULATIONS filed on even date herewith and the contents of which are hereby incorporated by reference.

Utilizing the inputs of Table 1 and the result is a SPICE behavioral circuit model by an S-parameter-to-SPICE circuit converter (e.g., jitter transfer model 306). In this example, the output of the transfer model 306 is $v_{jitter}(t)$. In this model:

$$H(\omega)=(H(\omega+\omega_0)/H(\omega_0)+H(\omega-\omega_0)/H(-\omega_0))/2$$

where $\omega_0$ is the clock frequency.

Figure 7:
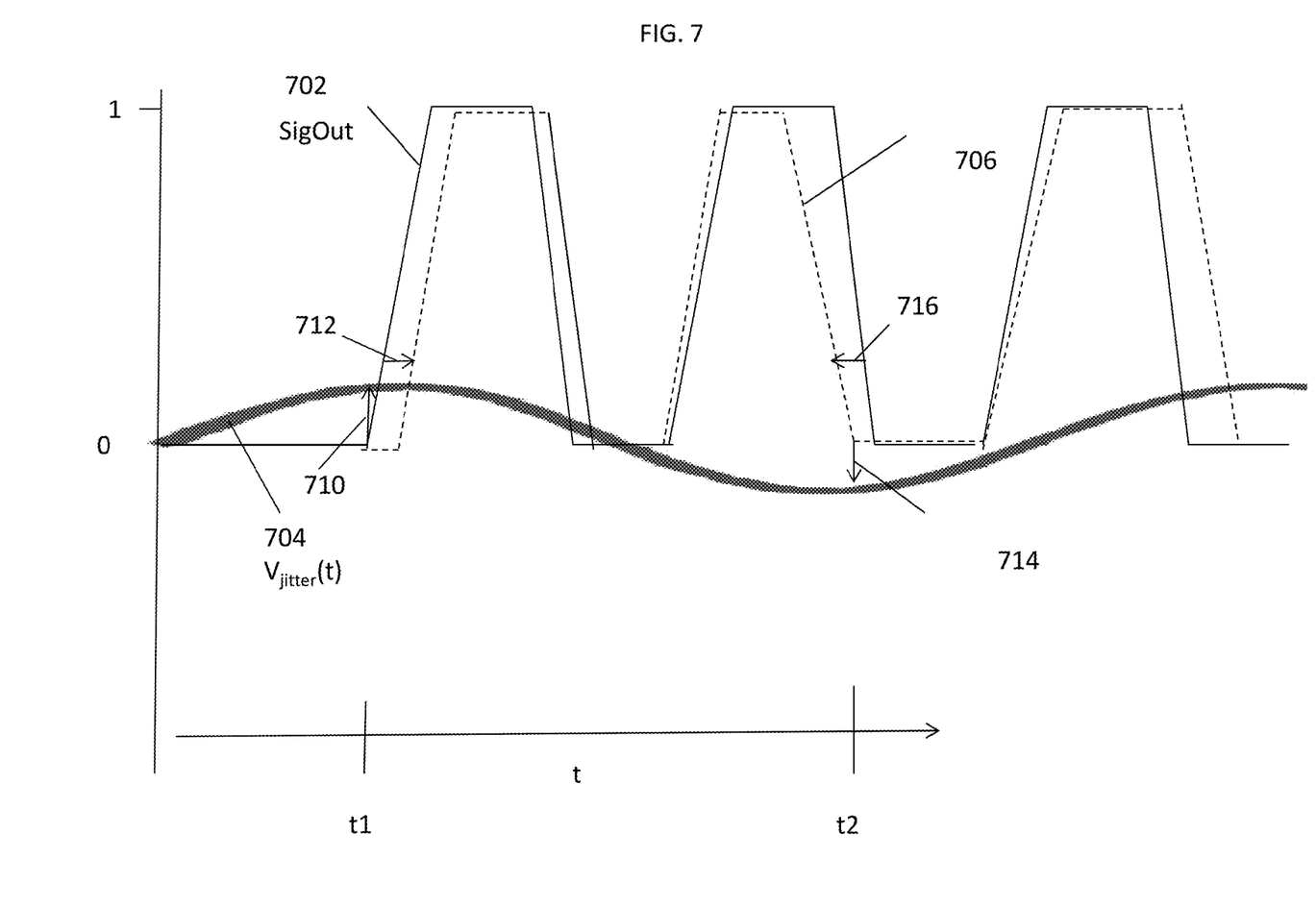
FIG. 7 is a graph showing the operation of a jitter modulator.

In FIG. 7, the output ($v_{jitter}(t)$) of the jitter transfer model function 606 is shown by trace 704. The particular shape of the trace 704 is not limited to that shown in FIG. 7 and can be any shape. The "value" on the vertical axis related trace 704 represents the amount that jitter may cause the signal SigOut to be altered. Trace 704 and 702 as shown both have voltage as their units on the x axis although the physical reality of trace 704 is the jitter with a time unit. A more detailed explanation of how $v_{jitter}(t)$ can be modulated on SigOut is provided in Co-pending U.S. patent application entitled "BEHAVIOURAL CIRCUIT JITTER MODEL" having Ser. No. 15/047,011, the contents of which are incorporated herein by reference.

Herein the modulated signal shall be referred to as $V_{jittered-signal}(t)$ or $v_{js}(t)$ for short. An example of $v_{js}(t)$ is shown as trace 706 in FIG. 7. For purposes of understanding, before an example of the processes performed by the jitter modulator 604 may be implemented, a step wise discussion of how $v_{js}(t)$ may be formed from traces 702 and 704 is provided.

As discussed above, trace 704 provides, for each time (t), a value in units of time that the jitter will cause trace 702 to be shifted. The shift can be either positive or negative depending on whether the amplitude of trace 704 is greater or less than zero. As such, the discussion below will account for negative shifting as will be understood by the skilled artisan based on the disclosure herein.

At a first time (t1) the value of 704 indicates that trace 702 should be shifted to the right by a time that is equal in magnitude to arrow 710. This shift is shown by arrow 712 and the resultant shifted signal is shown by trace 706 in FIG. 7. However, it shall be understood that a conversion factor (C) may be needed to convert from the voltage represented by arrow 712 to time. To that end, the amplitude of trace 404 may be converted to units of time by multiplying by C which, in one embodiment, has units of s/V and in a particular embodiment has units of 1 ns/V. It shall be understood that the shifted signal is not shifted the same amount as indicated by arrow 712 at all points but may be shifted different amounts depending on the magnitude of trace 704 at any given time. For instance, at time t2, trace 704 indicates that trace 702 should be shifted to the left (e.g., trace 704 has a negative time value) as indicated by arrows 714 and 416. It shall be understood that at each possible time, the same process may be repeated to cause the effects of $v_{jitter}(t)$ to be applied to SigOut to form $v_{js}(t)$.

Figure 8:
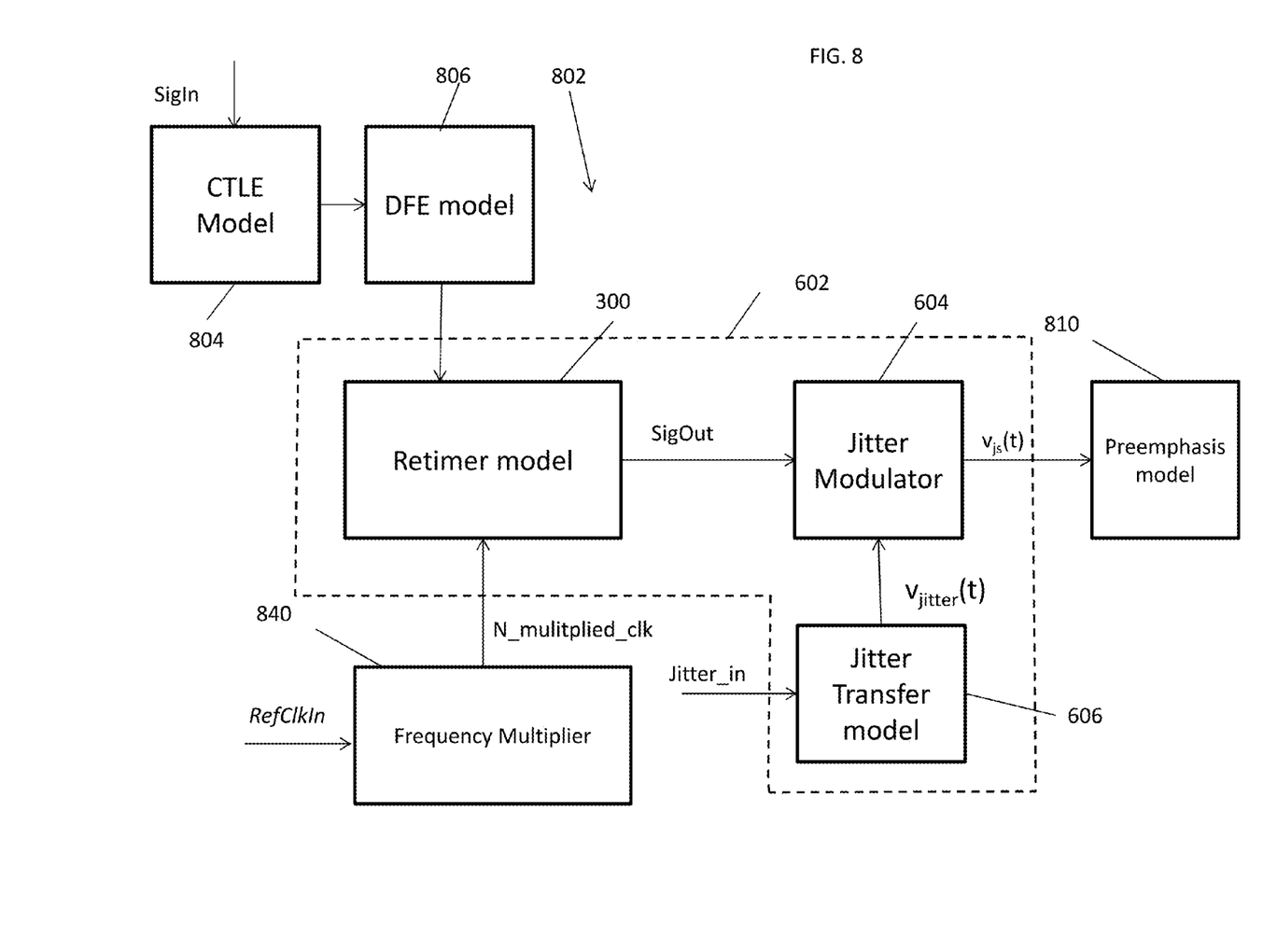
FIG. 8 is another embodiment of a reference clock driven retimer model.

FIG. 8 illustrates another embodiment of a retimer model 802. This model includes the model 602 described above and includes optional elements as well. In particular, this model includes an optional continuous time linear equalization (CTLE) model 804 and an optional decision feedback equalization (DFE) model 806. These models are known and will be utilized if the retimer includes one or both of these. SigIn is fed to one or both of these models before being provided to the reference clock driven retimer model 300.

Also, the output of jitter modulator 604 may be provided to an optional preemphasis model 810. Such models are known in the art.

Also shown in FIG. 8 is an optional reference clock frequency N-multiplier 840.

Figure 9:
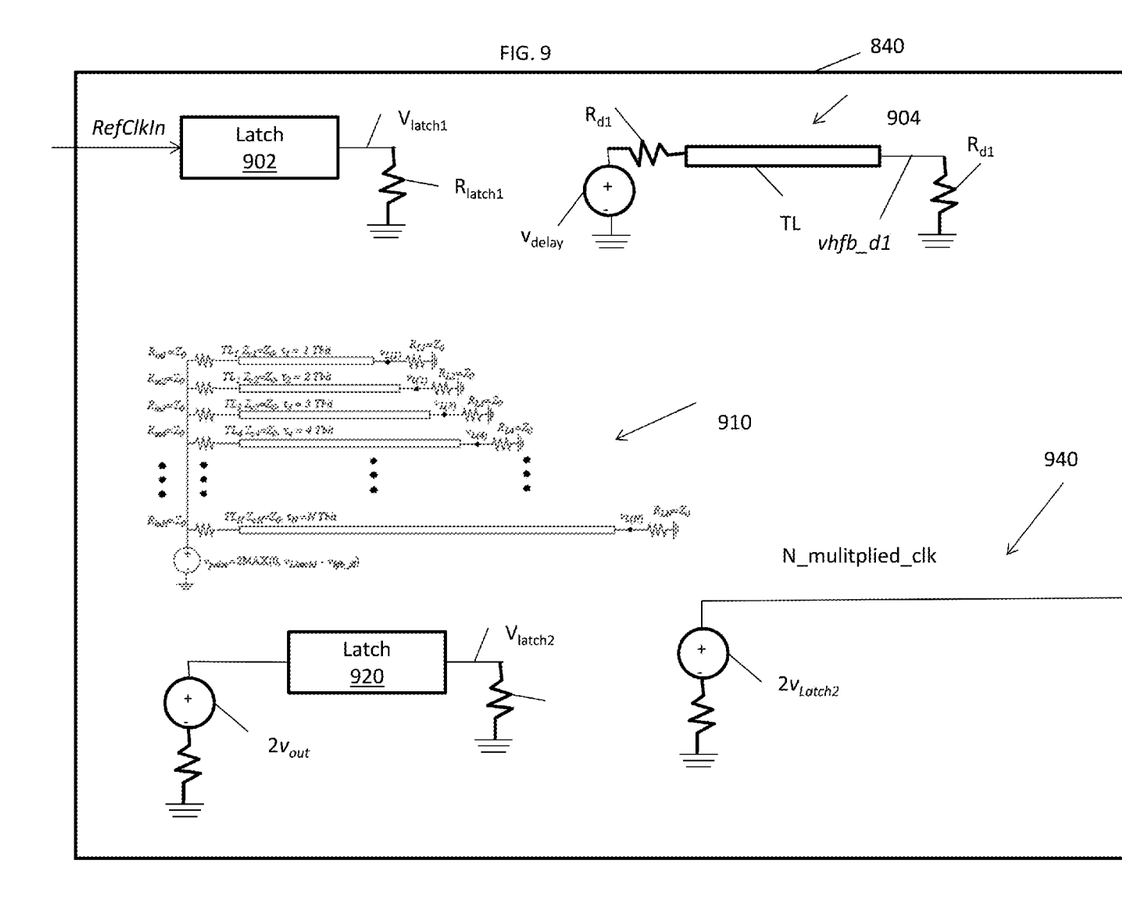
FIG. 9 shows an example on an N-clock multiplier that may be used in one embodiment of a reference clock driven retimer model.
Figure 10:
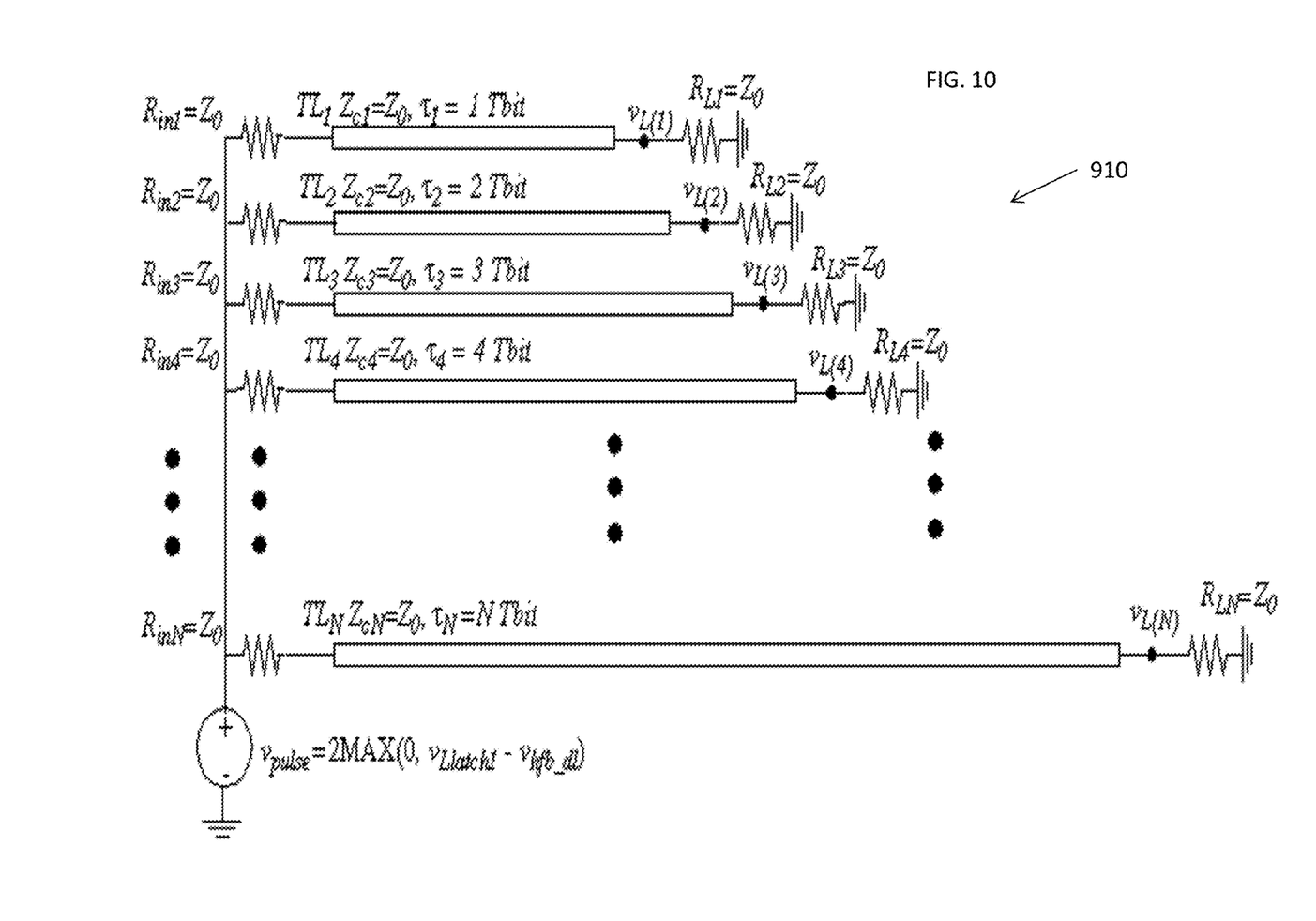
FIG. 10 is more detailed version of a portion of FIG. 9.

FIG. 9 shows a more detailed example of such a multiplier 840. In most applications, the clock transmitted in the reference clock channel is at a lower frequency that the bit rate. For example, some systems may transmit a 100 MHz clock even in cases where the signal rate is 10 Gb/s or higher. To that end, the clock is "sped-up" in such systems. A behavioral circuit model of the reference clock frequency Nmultiplier that performs such a clock speed increase may, therefore, be needed in some cases for an accurate simulation. Thus, the model shown in FIG. 9 may be implemented as a model of block 840. The input clock voltage signal RefClkIn is received by a latch 902 that may be of the type described above. The output of latch 902 is $v_{Llatch1}$. $v_{Llatch1}$ is processed by an ideal transmission line TL with time delay of 0.5T0 where T0 is the bit time of the system signal in subcircuit 904. This may be accomplished by a voltage source $v_{delay}$ that follows $V_{latch1}$ and may provide a voltage that is 2 $v_{latch1}$ through delay resistors $R_{d1}$ and $R_{d2}$ that are connected in series with TL. The output of TL is shown as voltage vhfb_d1. The difference between vLlatch1 and vhfb_d1 results in an impulse with a width of 0.5T0. The impulse propagates in the N ideal transmission lines in subcircuit 910 FIG. 9. In general, the N ideal transmission lines in subcircuit 910 resulting in N impulses with different delay times with a timing difference of T0 at the right-hand terminals of subcircuit 910. For clarity, a larger version of subcircuit 910 is shown in FIG. 10.

Each transmission line (TLn) has length such that the time constant of teach if equal to 1T0 (e.g, one bit time) and receives, as illustrated, an input pulse equal to 2 times the max of 0 or the difference between vLlatch1 and vhfb_d1. This pulse is provided by pulse generator vpulse. Each transmission line TLn has an input and output impedance equal to $Z_o$ on each end. The impulses are measures at $v_L(n)$ for each TL.

The output pulses may be combined according to:

$$v_{out} = \left\{\left[\sum_{i+1}^{N} v_{L(t)}\right] - V_{io}/2\right\}$$

This results in a first group of N impulses formed by the rise edge of the reference clock impulse. The voltage $v_{out}$ is latched by latch 920 to form $v_{latch2}$ and coupled to an output circuit 940 to produce N_mulitplied_clk.

The above description has included information related to how simulation models may be used. It shall be understood that the models may be used in the process of circuit design. That design may include forming an initial circuit design and then testing that design. The testing may including utilizing any of the circuits or circuit models disclosed herein. The results of the test may then be analyzed, either manually or automatically or by combination of both, to determine if the circuit "passed." This may include considering whether certain tolerances were exceeded. This may be done by, for example, comparing a threshold value to one or more of the outputs. For example, if certain timing requirements are not met or the circuit is too susceptible to cross-talk or jitter may determine if the circuit passed. In the event that the circuit does not pass, one or more of the circuit parameters may be changed and, in what turn out to be a repetitive cycle, the circuit is again tested. This may allow for circuit problems to be discovered and corrected before fabrication. Thus, in one embodiment, a method of forming a circuit is disclosed that includes forming and testing a first circuit model, changing the first circuit model to a second circuit model, optionally testing the second circuit model and providing the second circuit model to a production system or operation to create a physical circuit from some or all of the second circuit model.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of analyzing a transient response of an electronic circuit, the method comprising:
    forming a model of a retimer, the model including:
        a signal input circuit that receives an input signal;
        a clock input circuit that receives a reference clock signal;
        a slicer that samples a signal produced by the signal input circuit based on the reference clock signal; and
        an output signal circuit that forms an output signal from a sample taken by the slicer and that is based on the reference clock signal; and
    receiving and analyzing the output signal;
    wherein the signal input circuit includes a latch and that includes an latch input and a latch output, the latch input being coupled to ground through an input impedance and the latch output including a voltage controlled voltage source having positive and negative terminals, the negative terminal being coupled to ground through an output impedance and the positive terminal being connected to a latch output line, the method further comprising:
    forming a latch output signal based on a latch input signal received at the latch input with the voltage controlled voltage source, wherein the voltage controlled voltage source provides a high output when the latch input signal passes through a low to high transition value and continues to provide the high output until the latch input signal passes through a high to low transition value;
    wherein the voltage controlled voltage source generates a voltage that is based on the maximum of a first parameter and a second parameter;
    wherein the first parameter is $P_1(t)$ and the second parameter is $1-P_2(t)$ and wherein:

$$P_1(t)=(k1+k2*\mathrm{SGN}(v_{in}(t)-V_{shh2l}))*(1-P_2(t));$$

$$P_2(t)=k1+k2*\mathrm{SGN}(V_{shh2h}-v_{in}(t));$$

and k1 and k2 are constants, and $V_{shl2h}$ and $V_{shh2l}$ are switching voltages and $v_{in}(t)$ is the latch input signal.

2. The method of claim 1, wherein the slicer samples an output of the input circuit when a variable resistor is at a low value and holds the sample until a next time that the variable resistor is at the low value.

3. The method of claim 1, wherein the reference clock signal is produced by an N-multiplier that receives a first input that is at a first rate and produces the reference clock signal it at a second, higher rate.

4. The method of claim 1, wherein the model further includes a delay circuit that forms a delayed version of the reference clock signal.

5. The method of claim 1, further including:
    modulating jitter onto the output signal.

6. The method of claim 2, wherein a value of the variable resistor is set such that it is in the low value for a portion a bit time and in a high value during a remainder of the bit time.

7. The method of claim 3, wherein the N-multiplier includes a model N-parallel connected transmission lines.

8. The method of claim 4, wherein the reference clock signal and the delayed version of the reference clock signal control operation of the slicer.

9. A computer program product comprising a computer readable storage medium having program instructions embodied therewith, the program instructions executable by a processor chip to cause the processor chip to analyze a transient response of an electronic circuit by:
    forming a model of a retimer, the model including:
        a signal input circuit that receives an input signal;
        a clock input circuit that receives a reference clock signal;
        a slicer that samples a signal produced by the signal input circuit based on the reference clock signal; and
        an output signal circuit that forms an output signal from a sample taken by the slicer and that is based on the reference clock signal; and
    receiving and analyzing the output signal;
    wherein the signal input circuit includes a latch and that includes an latch input and a latch output, the latch input being coupled to ground through an input impedance and the latch output including a voltage controlled voltage source having positive and negative terminals, the negative terminal being coupled to ground through an output impedance and the positive terminal being connected to a latch output line, the method further comprising:

forming a latch output signal based on a latch input signal received at the latch input with the voltage controlled voltage source, wherein the voltage controlled voltage source provides a high output when the latch input signal passes through a low to high transition value and continues to provide the high output until the latch input signal passes through a high to low transition value;

wherein the voltage controlled voltage source generates a voltage that is based on the maximum of a first parameter and a second parameter;

wherein the first parameter is $P_1(t)$ and the second parameter is $1-P_2(t)$ and wherein:

$$P_1(t)=(k1+k2*SGN(v_{in}(t)-V_{shh2l}))*(1-P_2(t));$$

$$P_2(t)=k1+k2*SGN(V_{shl2h}-v_{in}(t));$$

and k1 and k2 are constants, and $V_{shl2h}$ and $V_{shh2l}$ are switching voltages and $v_{in}(t)$ is the latch input signal.

10. The computer program product of claim 9, wherein the slicer samples an output of the input circuit when a variable resistor is at a low value and holds the sample until a next time that the variable resistor is at the low value.

11. The computer program product of claim 9, wherein the reference clock signal is produced by an N-multiplier that receives a first input that is at a first rate and produces the reference clock signal it at a second, higher rate.

12. The computer program product of claim 9, wherein the model further includes a delay circuit that forms a delayed version of the reference clock signal.

13. The computer program product of claim 9, further including:

modulating jitter onto the output signal.

14. The computer program product of claim 10, wherein a value of the variable resistor is set such that it is in the low value for a portion a bit time and in a high value during a remainder of the bit time.

15. The computer program product of claim 11, wherein the N-multiplier includes a model N-parallel connected transmission lines.

16. The computer program product of claim 12, wherein the reference clock signal and the delayed version of the reference clock signal control operation of the slicer.

* * * * *